United States Patent Office 3,517,082
Patented June 23, 1970

---

3,517,082
PHENOLIC RESIN COATING AND PROCESS
OF COATING
Lloyd E. Cockerham, Terre Haute, Ind., assignor to Commercial Solvents Corporation, New York, N.Y., a corporation of Maryland
No Drawing. Filed June 26, 1967, Ser. No. 649,009
Int. Cl. C08g 37/18, 37/32
U.S. Cl. 260—840    5 Claims

ABSTRACT OF THE DISCLOSURE

A heat curing coating composition comprising 1-aza-5-ethyl-3,7-dioxabicyclo[3·3·0]octane, an allyl ether of a methylol phenol and a urea-formaldehyde resin.

SUMMARY OF THE INVENTION

This invention relates to coating compositions. In a particular aspect, it relates to heat curing coating compositions containing a 5-substituted-1-aza-3,7-dioxabicyclo[3·3·0]octane.

5-substituted-1-aza - 3,7 - dioxabicyclo[3·3·0]octanes were described by Senkus, J. Am. Chem. Soc. 67, 1515–1519 (1945). Danielson, U.S. Pat. 3,256,137, disclosed the use of such compounds in combination with meta-disubstituted benzenes, such as resorcinol and partially-reacted resorcinol-formaldehyde resins, to improve the bond between rubber stock and a textile fabric.

It is an object of this invention to provide new coating compositions.

It is a second object of this invention to provide heat curing coating compositions containing a 5-substituted-1-aza-3,7-dioxabicyclo[3·3·0]octane.

Another object of this invention is to provide a method of coating a metal article with the aforesaid heat curing coating composition.

A method has now been discovered for coating a metal article by applying to the surface of the article a heat curing coating composition comprising a 5-substituted-1-aza-3,7-dioxabicyclo[3·3·0]octane, an allyl ether of mono-, di-, or trimethylol phenol or mixtures thereof and a urea-formaldehyde resin, and heating the coating to a temperature of 350–400° F. for a length of time sufficient to effect a cure of the coating.

DETAILED DESCRIPTION

The dioxabicyclic octanes useful in the practice of this invention correspond to the following formula:

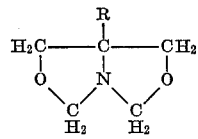

where R can be methyl, ethyl, or hydroxymethyl, preferably ethyl. These compounds can be prepared according to the method of Senkus, J. Am. Chem. Soc. 67, 1515–1519 (1945) whereby an alkanolamine having the formula

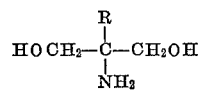

is reacted with 2 moles of formaldehyde. The bicyclic octane is then refined and is used in the practice of this invention in relatively pure, dry form. These compounds are readily miscible with the allyl ethers of the methylol phenols in the proportions of this invention. The methyl and ethyl derivatives are liquids at room temperature and the hydroxymethyl derivative is a solid at room temperature.

The allyl ethers of methylol phenols used in the practice of this invention include the allyl ether of monomethylol phenol, of dimethylol phenol and trimethylol phenol and mixtures thereof. Preferably, the product marketed by General Electric Company under the trademark Methylon 75108 is employed.

Methylon 75108 is coating intermediate containing a mixture of the allyl ethers of mono-, di-, and trimethylol phenols. It is described by R. W. Martin in U.S. Pats. 2,579,329, 2,579,330, 2,579,331, 2,598,406, 2,606,929, and 2,606,935. More specifically, it is described as a mixture corresponding to the structure represented by the following formula:

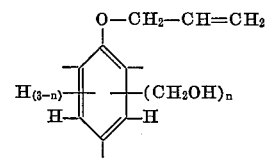

where $n$ is an integer of 1 to 3. When $n$ is 3, the compound represented thereby is preferably in an amount equal to at least 50% by weight, but may be present in amount ranging, for example, from 10 to 90% by weight, or more. It is not a finished coating material and heretofore was blended with other coating resins, usually bisphenol-epichloro-hydrin epoxy resins and polyvinyl acetals. Prior to the present invention, Methylon 75108 was cured in the presence of an acid catalyst, e.g. from 0.5% to 1.5% of 85% syrupy phosphoric acid.

The urea-formaldehyde resin used in the practice of this invention can be any suitable urea-formaldehyde resin, preferably Beetle 216–8 marketed by American Cyanamid Company. This resin is described by the manufacturer as being an unmodified urea-formaldehyde resin having the following specifications:

Solids±2%—60%
Butyl alcohol—35%
Xylol—5%
Color, Gardner 1933, max.—1
Viscosity, Gardner-Holdt, 25° C.—S–V
Hydrocarbon solvent tolerance, min.—350
Acid number, solid resin—0.5–2.0
Pounds per gallon, approx.—8.5

In addition to the above components, various pigments and the like can be used to provide color, opacity or other special characteristics as is known to those skilled in the art. If desired, a thickening agent can be added.

The amounts of the various components of the coating composition of this invention can vary rather widely without departing from the concepts of this invention. Generally, the urea-formaldehyde is present to the extent of 8–12% wt. exclusive of pigments and special additives, preferably about 10%. The dioxabicyclic octane and the allyl methylol phenol ethers are present in a ratio of from about 1:1 to 1:3 based on parts by weight.

The coating composition of this invention is stable at ordinary temperatures. When ready for use, it is applied to the article to be coated by any suitable means, e.g. by spraying, brushing, dipping, or calendering, and the article is then heated to 350–400° F. The length of the heating period varies from about 10 minutes at 400° F. to about 20–30 minutes at 350° F.

Although the composition of this invention is generally considered primarily useful as a coating, it can also be used as a heat curing adhesive to bond two surfaces. In such a use, the composition is applied to the surfaces to be joined which are then placed in intimate contact followed by heating to 350–400° F. for a period of time sufficient to effect a bond between the surfaces.

The following examples further illustrate the invention.

EXAMPLE 1

Methylon 75108 prepared according to the method disclosed by R. W. Martin, U.S. Pat. 2,606,929, was mixed with 1-aza-5-ethyl-3,7-dioxabicyclo[3.3.0]octane (henceforth to be referred to as compound E) in varying proportions, both with and without Beetle 216–8 urea-formaldehyde resin. The mixtures were applied to steel panels using a 1.5 mil coating bar and oven baked for the times given.

The baked film was inspected for appearance and tested for flexibility, film hardness, and impact resistance in accordance with procedures generally used by those skilled in the art. The results are given in Table 1. The figures for film hardness signify that the film was not damaged by a pencil of the hardness given, but was damaged by a pencil of the next hardness in the series. Impact resistance was tested by a Gardner Impact Tester.

The poor appearance of samples 1–5 was due to pinholes which were substantially eliminated when the urea-formaldehyde resin was incorporated in the coating. The effectiveness of compound E in improving impact resistance is notable.

methylol phenol corresponding to the structure represented by the formula:

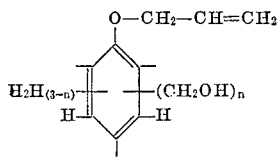

where $n$ is an integer of 1 to 3, (c) a urea-formaldehyde resin, in a ratio of from about 25 to about 50 parts of the said 5-substituted-1-aza-3,7-dioxabicyclo(3·3·0)octane, from about 50 to about 75 parts of said allyl ether of mono-, di-, or trimethylol phenol or mixtures thereof, and from 8 to about 12 parts of said urea-formaldehyde resin.

2. The composition of claim 1 wherein
(a) is 1-aza-5-ethyl-3,7-dioxabicyclo(3·3·0)octane.

3. The composition of claim 1 wherein
(a) is 1-aza-5-methyl-3,7-dioxabicyclo(3·3·0) octane.

4. The composition of claim 1 wherein
(a) is 1-aza-5-hydroxymethyl-3,7-dioxabicyclo(3·3·0) octane.

5. A method of coating the surface of an article comprising the steps of applying to the surface of said article a composition comprising 1-aza-5-ethyl-3,7-dioxabicyclo (3·3·0)octane, 25–50 parts by weight; a mixture of the

TABLE 1

| Sample | Phenolic resin, g. | Compound E, g. | Urea-form., g. | Heating time, min. | Temp., °F. | Pencil hardness | Flexibility, mandrel (in.) | Impact, in.-lb. | Film appearance |
|---|---|---|---|---|---|---|---|---|---|
| 1 | 100 | 0 | 0 | 20 | 350 | 2H | 1/8 | 20 | Poor. |
| 2 | 75 | 25 | 0 | 20 | 350 | 3H | 1/8 | 80 | Do. |
| 3 | 50 | 50 | 0 | 20 | 350 | 3H | 1/8 | 80 | Do. |
| 4 | 100 | 0 | 0 | 30 | 350 | 4H | 1/8 | 15 | Do. |
| 5 | 75 | 25 | 0 | 30 | 350 | 5H | 1/8 | 40 | Do. |
| 6 | 50 | 50 | 0 | 30 | 350 | 5H | 1/8 | 80 | Do. |
| 7 | 50 | 50 | 10 | 30 | 350 | 3H | 1/8 | 80 | Good. |
| 8 | 50 | 50 | 10 | 20 | 350 | H | 1/8 | 80 | Do. |
| 9 | 50 | 50 | 10 | 10 | 400 | 9H | 1/8 | 80 | Do. |
| 10 | 50 | 50 | 10 | 15 | 400 | 9H | 5/16 | −5 | Do. |
| 11 | 50 | 50 | 10 | 20 | 400 | 9H | 7/16 | −5 | Do. |

EXAMPLE 2

The experiment of Example 1, samples 7–9, is repeated except that 1 - aza - 5 - methyl-3,7-dioxabicyclo [3.3.0]octane is used in place of compound E. The film obtained has good impact resistance and good appearance.

EXAMPLE 3

The experiment of Example 1, samples 7–9, is repeated except that 1 - aza - 5 - hydroxymethyl - 3,7-dioxabicyclo[3.3.0]octane is used in place of compound E. The film obtained has good impact resistance and good appearance.

What is claimed is:

1. In combination, a heat curing coating composition comprising (a) a 5 - substituted-1-aza-3,7-dioxabicyclo(3·3·0)octane corresponding to the formula

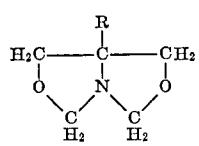

where R is methyl, ethyl, or hydroxymethyl, (b) a mixture of the allyl ethers of mono-, di-, or triallyl ethers of mono-, di-, and trimethylol phenol, 50–75 parts by weight, said ethers being represented by the formula

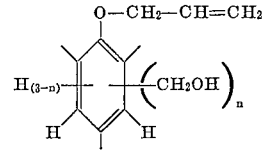

where $n$ is an integer of 1 to 3, and a urea-formaldehyde resin, 8–12 parts by weight, and heating said coating composition to a temperature of from 350 to 400° F. for a period of time of from about 30 minutes at 350° F. to about 10 minutes at 400° F.

References Cited

UNITED STATES PATENTS

| | | | |
|---|---|---|---|
| 2,606,929 | 8/1952 | Martin | 260—52 |
| 2,606,935 | 8/1952 | Martin | 260—52 |
| 3,256,137 | 6/1966 | Danielson | 260—845 |
| 3,266,970 | 8/1966 | Paul | 260—845 |

MURRAY TILLMAN, Primary Examiner

J. C. BLEUTGE, Assistant Examiner

U.S. Cl. X.R.

117—161; 156—331, 335; 260—33.4, 51.5, 851

UNITED STATES PATENT OFFICE
CERTIFICATE OF CORRECTION

Patent No. 3,517,082          Dated June 23, 1970

Inventor(s) Lloyd E. Cockerham

It is certified that error appears in the above-identified patent and that said Letters Patent are hereby corrected as shown below:

Column 4, line 6, that portion of the formula reading "$H_2H_{(3-n)}$" should read -- $H_{(3-n)}$ --.

SIGNED AND SEALED
OCT 6 - 1970

(SEAL)
Attest:

Edward M. Fletcher, Jr.
Attesting Officer

WILLIAM E. SCHUYLER, JR.
Commissioner of Patents